July 14, 1970     K. M. HOLLAND     3,520,763
METHOD OF AND MEANS FOR SPLICING HONEYCOMB PACKS
Filed June 7, 1967
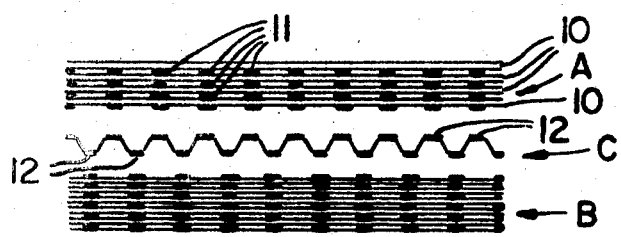
FIG_1
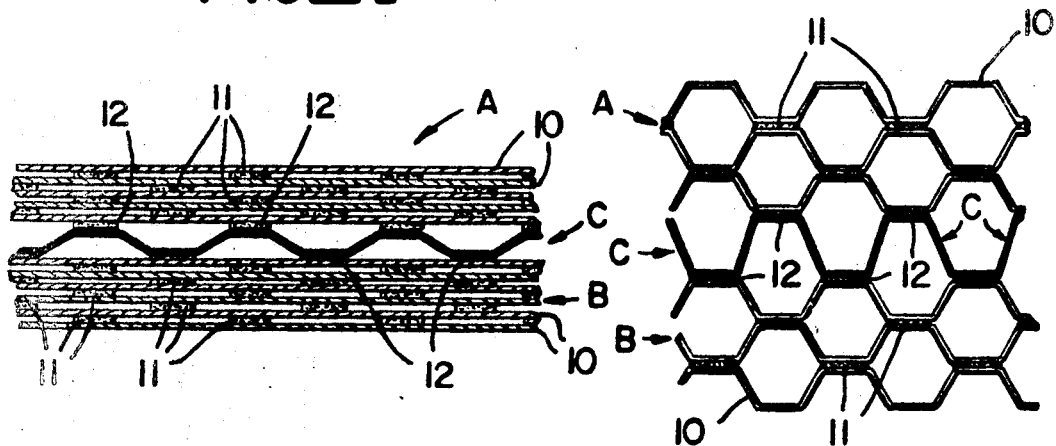
FIG_2A     FIG_2B
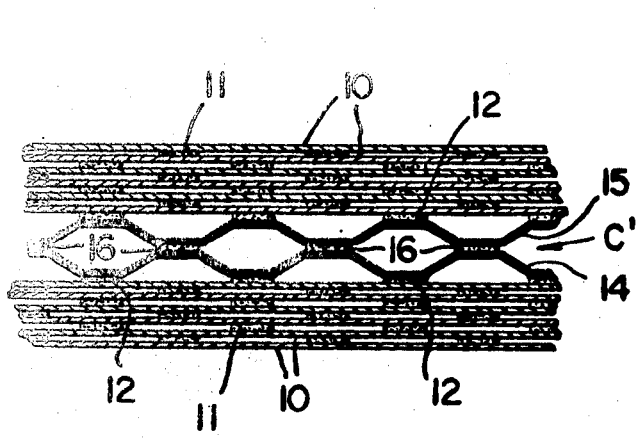 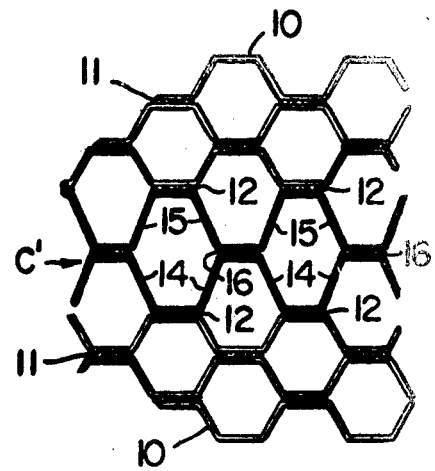
FIG_3A     FIG_3B
INVENTOR.
KENNETH M. HOLLAND
BY
*Townsend and Townsend*
ATTORNEYS

United States Patent Office 3,520,763
Patented July 14, 1970

3,520,763
METHOD OF AND MEANS FOR SPLICING HONEYCOMB PACKS
Kenneth M. Holland, Orinda, Calif., assignor to Hexcel Corporation, Dublin, Calif., a corporation of California
Filed June 7, 1967, Ser. No. 644,210
Int. Cl. B32b 3/12; B31d 3/02
U.S. Cl. 161—68                                    4 Claims

ABSTRACT OF THE DISCLOSURE

The present application relates to a method and means for splicing together two or more packs of unexpanded honeycomb so that the same can be expanded into a continuous section of indefinite length. The splicing element consists of a corrugated metal ribbon having its nodes adhesively bonded to adjacent end webs of two honeycomb packs to be spliced together and then expanded as a larger integral honeycomb panel.

---

This invention relates to the art of adhesively splicing or bonding two or more packs of unexpanded honeycomb together to permit the several packs to be expanded endwise to form an integral expanded honeycomb panel section.

It has been heretofore proposed that individual slices or packs of conventional unexpanded honeycomb, such as packs of unexpanded paper honeycomb, be bonded to one another in end to end relationship and thereafter continuously expanding the structure to any length desired. An example of additive bonding in the prior art is disclosed in U.S. Pat. No. 2,731,379 to Donald B. Wheeler, dated Jan. 17, 1956. There are no insurmountable or substantially difficult problems encountered in the additive bonding of slices or packs of relatively large cell size cheap grade honeycomb materials, such as the normal commercial grade paper honeycomb, as particularly contemplated in the Wheeler patent disclosure. In dealing with materials such as paper honeycomb, the amount of adhesive used in the additive bond is not critical and because the adhesive is applied and adhered in a wet state to relatively absorbent paper there is no particular problem involved in applying continuous heat and substantial pressure to accomplish a firm and secure adhesive bond between the materials. Basically, all that is necessary is to apply enough wet adhesive to bond two packs together at spaced points and to maintain the adjacent packs in contact with each other until the adhesive dries, whereupon the composite structure can be expanded as an integral honeycomb panel.

In applying the concepts and principles of additive bonding to honeycomb materials other than paper, and particularly metal honeycomb, serious problems are encountered which have not been solved by any prior art practice of which I am aware. A particularly difficult problem encountered in the additive bonding of metal honeycomb packs or slices involves application of a sustained and uniform pressure between adjacent packs to obtain a sufficiently secure adhesive bond throughout the entire ribbon length of the two packs. In this connection, an unexpanded metal honeycomb slide or section presents a very rigid and non-resilient structure approaching the rigidity of a solid aluminum bar. Accordingly, it requires the application of relatively high and difficult to apply pressures to compress tightly together adjacent end ribbons of two or more packs of such material in order to obtain a proper and uniform bonding pressure between the glue lines applied thereto.

Further, because of the non-absorbency of metal and the difficulty in venting off volatiles, it is not considered practical to bond metal honeycomb packs together in the conventional fashion by using wet line adhesives. To the contrary, it is the practice to employ dry line thermosetting types of adhesives by which the lines are applied in a liquid or wet stage and then dried to a second or B stage before the metal surfaces to be bonded are compressed in contact with each other. While the adhesive lines are in their relatively dry non-tacky B stage the metal surfaces are subjected to heat and pressure to cause adhesive lines to flow into contact with adjacent surfaces. Further, the practice in the bonded aluminum honeycomb art is to apply the adhesive in very thin deposits of perhaps less than .0001" thickness. Hence the slightest unevenness between adjacent ribbon surfaces of two unexpanded packs to be bonded together magnifies the difficulty and problem of applying sufficiently high and uniform pressures between two or more packs to insure close and intimate bonding contact between the adhesive lines and adjacent metal surfaces throughout the ribbon length of the packs.

The present invention involves the use of a corrugated ribbon of metal foil with adhesive applied only to the corrugation nodes which said corrugated ribbon is interposed between contiguous ribbon surfaces of two unexpanded packs or slices of honeycomb. In addition to overcoming the problems encountered with prior art additive bonding or splicing techniques as above outlined, the present invention performs the following more specific functions and objectives as follows:

(1) The corrugated metal foil ribbon is sufficiently pliable to bend and contract (purse) in the ribbon direction of the honeycomb as it is expanded lengthwise. (In this connection conventional honeycomb purses or contracts in the L or ribbon direction as it is expanded lengthwise in the W direction.)

(2) The corrugated aluminum foil splice sheet will act as its own "press pad" and function to fill or compensate for any gaps formed by uneven surfaces between adjacent honeycomb packs.

(3) The corrugated foil splice sheet permits the use of a broad variety of adhesives including adhesives used in their liquid form while readily enables the obtaining of the desired splice characteristics and capabilities including the obtaining of sufficiently high shear strengths and other physical and chemical characteristics.

(4) The splice sheet can be fabricated to any desired wave length and amplitude of corrugations to provide any desired node point spacing between the honeycomb packs to be bonded together.

(5) The open spaces formed by the corrugated splice sheet provides ventilation which permits rapid heat drying and/or curing of the adhesive and provides venting passages for volatiles in the adhesive as it dries or cures.

(6) The use of a corrugated splice sheet as contemplated by this invention permits visual inspection and mechanical testing as desired of each splice prior to expanding of the composite honeycomb structure.

(7) The practice of the present invention in terms of equipment, tooling and technological skill is relatively inexpensive and uncomplicated.

In the drawings:

FIG. 1 is a schematic exploded plan view showing two unexpanded packs of honeycomb with a single corrugated splice sheet interposed therebetween and showing the ribbon webs of the honeycomb and the splicing element in single lines.

FIG. 2(a) is an enlarged fragmentary plan view of two unexpanded packs of honeycomb showing a single corrugated splice sheet bonded to adjacent end webs of the packs.

FIG. 2(b) is the same as FIG. 2(a) showing the honeycomb packs joined by the splicing element after expansion.

FIG. 3(a) is a modified embodiment of the invention wherein the splice sheet comprises a double ribbon corrugated splice element formed in the nature of a single row of pre-expanded honeycomb cells.

FIG. 3(b) shows the structure of FIG. 3(a) after the honeycomb has been expanded.

Referring now more specifically to the drawings, the reference characters A and B indicate generally two packs of unexpanded metal honeycomb (such as unexpanded aluminum honeycomb) which are to be spliced together in end-to-end relationship by a corrugated splicing element indicated generally at C and which is shown in solid black lines to make it more readily distinguishable in the drawings. It may be assumed that the honeycomb packs A and B are produced according to conventional practice and each comprises more specifically a plurality of ribbons of metal foil 10 which are bonded together by glue lines 11 and wherein the glue lines bonding adjacent ribbons are disposed in alternately staggered relationship so that upon end-wise expansion of the slices (in the W direction) the material will open up and expand into a honeycomb configuration.

The splice sheet indicated at C in FIGS. 1, 2(a) and 2(b) comprises a pre-corrugated metal ribbon of substantially the same length (L dimension) and height or thickness (T dimension) as the ribbons forming the honeycomb packs A and B. Preferably the corrugated splice sheet C is formed from metal of the same foil thickness and alloy as the honeycomb ribbons so that a splice sheet will readily bendably deform and purse inwardly corresponding to the degree of inward pursing or contraction of the honeycomb splices when the latter are expanded. In this connection, it is well known that conventional honeycomb narrows by pursing in the direction of its L dimension as it is expanded outwardly in the W direction. In use and operation the unexpanded packs of honeycomb to be spliced together and expanded as a unit may be supported on any suitable expanding table surface in spaced relation whereupon the corrugated splice sheet C (to the nodes of which has been applied lines of adhesive 12) is interposed between the joining end ribbons of the honeycomb packs in the arrangements shown in FIGS. 1 and 2(a) of the drawings. The adhesive 12 may be applied to the splicing element C in any conventional fashion such as running the nodes of the corrugated ribbon over a roller coating applicator (not shown). As above noted, the adhesive may be applied and used in the splicing operation while still in a wet state so as to avoid the necessity of having to apply heat and pressure to effect an intimate bond between adhesive and adjoining metal surfaces.

FIG. 2(a) shows the two slices of honeycomb A and B with the corrugated splice sheet interposed between the two and with the adhesive lines 12 bonding the element C at its nodal areas to contiguous end webs or ribbons of the slices. Assuming that a wet line adhesive 12 is employed, the same would be dried or cured sufficiently to effect an intimate bond with the honeycomb ribbons before the two packs are expanded to form an integral honeycomb section such as indicated fragmentarily in FIG. 2(b). It is noted that the corrugated splice sheet C will bendably deform and purse in the direction of its ribbon length due to the expansion and corresponding contraction of the honeycomb splices.

FIGS. 3(a) and 3(b) may be considered as showing the identical type of arrangement described in reference to FIGS. 1, 2(a) and 2(b), except that FIGS. 3(a) and 3(b) show the use of a double corrugated splicing element C' (also shown in solid black lines). More specifically, element C' consists of a pair of oppositely corrugated ribbons 14 and 15 which have been assembled and bonded together as at 16 to form and effect a single row of hexagonal honeycomb cells. The outer nodes of the double ribbon element C' are bonded by glue lines 12 to adjacent end webs of the honeycomb splices A and B prior to expansion of the material as a unit as indicated in FIG. 3(b).

Although for purposes of simplicity of illustration and explanation, the splice sheets C and C' are shown as having spaced nodal areas corresponding to the spacing between adhesive lines 11 defining the honeycomb material, it has been found in practice for many applications that it is not necessary to relate the spacing of the nodes of the splice sheets to correspond to the spacing of the alternately staggered glue lines which bond the ribbons of the honeycomb material together. When the nodes are of a different spacing than the lines of the honeycomb material, there will be some deformity of the ribbons and of the splice sheet when the material is fully expanded. Whether or not such deformity along the splice seams can be tolerated would depend entirely on the specifications required of the expanded material including tolerances allowed for uniformity of cell configuration, density and the like.

Although the present invention has been described in some detail by way of illustration and example, it is understood that certain changes and variations may be made within the spirit of the invention as limited only by the scope of the claims appended hereto.

I claim:
1. A honeycomb product comprising at least two packs of unexpanded honeycomb each comprising flat ribbons of sheet material with alternate sheets bonded together at staggered bonding points, and an intermediate corrugated bonding sheet joining said two unexpanded packs together to permit the packs to be expanded endwise to form an integral expanded honeycomb panel.

2. The combination of claim 1 and wherein the intermediate corrugated sheet is bonded at its corrugated node points to contacting end webs of an adjacent pair of packs of unexpanded honeycomb.

3. The method of splicing two packs of unexpanded honeycomb together for expansion as an integral unit comprising the steps of interposing between contiguous end webs of two unexpanded packs a corrugated ribbon of material, and bonding the nodes of the ribbon to the adjacent end webs of the packs to form a spliced joint between the two packs.

4. A honeycomb structure comprising two unexpanded packs of honeycomb joined endwise by a splicing element; said splicing element comprising a corrugated ribbon of sheet material bonded by adhesive at its nodal areas to the end webs of the adjacent two packs of honeycomb.

References Cited

UNITED STATES PATENTS

| | | | |
|---|---|---|---|
| 2,576,530 | 11/1951 | Medal | 52—584 |
| 2,731,379 | 1/1956 | Wheeler | 156—197 |
| 2,936,021 | 5/1960 | Steele et al. | 156—598 |
| 3,044,921 | 7/1962 | Wentworth et al. | 156—205 |
| 3,301,732 | 1/1967 | Kunz | 156—267 XR |

JOHN T. GOOLKASIAN, Primary Examiner

H. F. EPSTEIN, Assistant Examiner

U.S. Cl. X.R.

29—455, 471.1; 52—581; 156—197, 304